US007788900B2

(12) United States Patent  (10) Patent No.: US 7,788,900 B2
Dulligan et al.  (45) Date of Patent: Sep. 7, 2010

(54) ELECTRICALLY CONTROLLED EXTINGUISHABLE SOLID PROPELLANT MOTORS

(76) Inventors: Michael Dulligan, 43424 16th West, Apt. 24, Lancaster, CA (US) 93534; James Lake, 649 Macedonia Dr., Punta Gorda, FL (US) 33950; Paul Adkison, 9310 Columbine Ave., California City, CA (US) 93505; Greg Spanjers, 20 Kiva Pl., Sandia Park, NM (US) 87047; David White, 4360 San Juan Ct., Rosamond, CA (US) 93560; Hieu Nguyen, 2727 Sandstone Ct., Palmdale, CA (US) 93551

( * ) Notice: Subject to any disclaimer, the term of this patent is extended or adjusted under 35 U.S.C. 154(b) by 2158 days.

(21) Appl. No.: 10/342,718

(22) Filed: Jan. 14, 2003

(65) Prior Publication Data
US 2008/0092521 A1  Apr. 24, 2008

Related U.S. Application Data

(60) Provisional application No. 60/349,169, filed on Jan. 16, 2002.

(51) Int. Cl.
 *F02K 9/96* (2006.01)
(52) U.S. Cl. .......................... 60/254; 60/234
(58) Field of Classification Search ............... 60/242, 60/233, 234, 250, 253, 257, 271, 240, 247, 60/254, 255, 256
See application file for complete search history.

(56) References Cited

U.S. PATENT DOCUMENTS

| | | | |
|---|---|---|---|
| 3,023,570 A | 3/1962 | Crouch | |
| 3,989,191 A | 11/1976 | McCullough | |
| 4,078,953 A | 3/1978 | Sayles | |
| 4,357,795 A | 11/1982 | Bastian et al. | |
| 4,397,149 A | 8/1983 | Kosaka et al. | |
| 4,411,717 A | 10/1983 | Anderson | |
| 4,550,888 A | 11/1985 | Douglass et al. | |
| 4,756,251 A | 7/1988 | Hightower, Jr. et al. | |
| 4,840,024 A | 6/1989 | McDonald | |
| 4,952,341 A | 8/1990 | Sayles | |
| 4,972,673 A | 11/1990 | Carrier et al. | |
| 5,099,645 A | 3/1992 | Schuler et al. | |
| 5,372,070 A | 12/1994 | Neidert et al. | |
| 5,491,973 A | 2/1996 | Knapp et al. | |
| 5,515,765 A | 5/1996 | Wilkinson | |
| 5,533,331 A | 7/1996 | Campbell et al. | |
| 5,675,966 A | 10/1997 | Dombrowski et al. | |
| 5,715,675 A | 2/1998 | Smith et al. | |
| 5,808,231 A | 9/1998 | Johnston et al. | |
| 5,847,315 A | 12/1998 | Katzakian, Jr. et al. | |
| 5,854,439 A | 12/1998 | Almström et al. | |
| 6,086,692 A | 7/2000 | Hawkins et al. | |
| 6,125,763 A | 10/2000 | Kline et al. | |

*Primary Examiner*—Timothy D Collins
(74) *Attorney, Agent, or Firm*—Christie, Parker & Hale, LLP (57) ABSTRACT

Motor designs that enable the control of ignition, combustion burn rate, extinguishment, and reignition of solid propellants by precise application of electrical power are provided. Design of such motors, including choice of electrode materials, the form of electric power, and exemplary facial-extent electrode and axial-extent electrode configurations are also provided.

30 Claims, 12 Drawing Sheets

ELECTRICALLY CONTROLLED EXTINGUISHABLE SOLID PROPELLANT MOTORS

CROSS-REFERENCE TO RELATED APPLICATIONS

This application claims priority based on U.S. provisional application No. 60/349,169, filed Jan. 16, 2002, which is incorporated herein by reference.

STATEMENT REGARDING FEDERALLY SPONSORED RESEARCH

The U.S. Government has certain rights in this invention pursuant to contract numbers F04611-C-99-0020 and F04611-99-C-0003 awarded by the U.S. Department of the Air Force.

FIELD OF INVENTION

The invention relates to motor designs that utilize electrically controlled extinguishable solid propellants for the purpose of generating thrust that is throttleable, extinguishable, and reignitable.

BACKGROUND OF INVENTION

Developers of modern thrusters have long sought to achieve increased reliability, performance and flexibility of operation for such thrusters. Two principal thruster designs are utilized, those which utilize liquid propellants, and those which utilize solid propellants.

Thrusters that utilize liquid propellants are capable of controlled thrust, including the ability to stop and restart on command. Though the system reliability is generally acceptable, the complexity associated with the many moving parts, such as valves, required for their operation creates significant additional design and construction expense. In addition, the majority of liquid propulsion systems utilize propellants that are toxic to humans.

Although the technology of liquid propellant thruster systems is mature and proven, room for improvement exists. In U.S. Pat. No. 5,533,331, Campbell, et al. disclose the state-of-the-art for non-toxic liquid propulsion systems, with a focus on missile divert thrusters and attitude control thrusters. Although the liquid propellant system disclosed by Campbell et al. enable full thrust control over a wide range of values, are completely capable of many start/stop/restart cycles, and further provide a solution to the toxicity issue, the system is still encumbered by complex plumbing hardware.

In contrast, thrusters that utilize solid propellants offer improved reliability relative to the counterpart liquid propellant thrusters as a result of their reduced complexity. However, the penalty is that solid propellant thruster systems are unable to simply throttle output thrust in accordance with real-time commands by the user.

For example, one mechanical means of controlling thrust of such a solid propellant thruster is to manufacture the thruster in such a way as to intentionally produce void space within the grain of the solid propellant. The function of such void space being to alter the volume in which the combustion product gasses may expand, thereby changing the pressure and propellant burn rate and thrust. The obvious limitation of such techniques is that the thrust profile is fixed at the time of manufacture, with no provision for real-time alteration of thrust level. Examples of such systems are provided in U.S. Pat. No. 4,357,795 to Bastian, et al. and U.S. Pat. No. 3,023,570 to Crouch.

Although such grain voids may be able to control the rate of thrust, systems that achieve multiple restarts for solid propellant thrusters tend to focus on discrete segments of propellant charges separated by some form of frangible material and separate ignition means. For example, U.S. Pat. No. 4,972,673 to Carrier, et al. provides a dual stage solid propellant rocket motor that relies upon a physical barrier between two distinct propellant grain regions to be broken upon command. However, problems arise in designing a barrier material that is capable of maintaining insulating integrity without fail before the command to ignite the protected segment, and yet will fracture with certainty when the command is made. Despite this inherent problem, development of these membrane separation solid propellant thrusters continues, such as, for example, in U.S. Pat. No. 5,675,966 to Dombrowski, et al.

A particularly innovative means of thrust control that also achieves the zero thrust, start/stop multicycle operation is disclosed in McDonald, et al.'s U.S. Pat. No. 4,840,024, and U.S. Pat. No. 5,808,231 to Johnston, et al., in which a complex system of valves and ducting is employed to control thrust. Specifically, in such a system the pressure within the combustion chamber may be suddenly reduced by appropriate valve operation such that the solid propellant extinguishes. Reignition is accomplished by another valve operation sequence that introduces gas generator products into the combustion chamber, thus allowing for an increase in pressure and temperature sufficient to cause propellant reignition. However, a significant problem associated with this solution to the problem of thrust control and restartability for solid propellant thrusters is the extreme complexity of the valving apparatus and the significant increase in total system mass.

Another creative solution to solid propellant thruster control is disclosed by Kosaka, et al. in U.S. Pat. No. 4,397,149, in which they disclose the invention of a multi grain solid propellant thruster system, whereby increased thrust is achieved when a grain that is not yet ignited is mechanically moved into position to ignite and thus augment thrust. Although a variety of such mechanical means have been proven successful for controlling the thrust of solid propellant thrusters, such as by altering the nozzle throat area, as McCullough indicates in U.S. Pat. No. 3,989,191, most of these designs suffer from the erosion of the moving parts exposed to the extreme environment of the combustion zone. For example, Knapp, et al., in U.S. Pat. No. 5,491,973 disclose a pintle assembly which is self-actuated to vary the nozzle throat area and thus alter thrust. However, erosion of the mechanism is a serious problem and no provision for complete extinguishment with subsequent restart exists.

Finally, another novel approach to controlling thrust by variations in the combustion gasses exit area is disclosed by Douglass, et al. in U.S. Pat. No. 4,550,888 in which a series of valves capable of surviving high temperature are placed in parallel fashion with the combustion chamber. Changes in thrust are achieved by altering the number of exhaust valves that are open, effectively changing the exit area; however, no provision for extinguishing and then reigniting the propellant exists.

Between the two extreme classes of thruster systems is the hybrid thruster, which is an attempt to combine the advantages of the solid and liquid thruster systems typically by using a solid fuel and an injected liquid oxidizer to ignite the propellant in a hypergolic fashion. Although the complexity of these systems is cut in half, the hybrid system still requires complex valves and generally toxic propellants.

A thorough description of the prior art of hybrid thruster systems is found in U.S. Pat. No. 5,715,675 to Smith, et al. and also in U.S. Pat. No. 5,099,645 to Schuler, et al. Smith, et al. clearly state that the most significant problem associated with hybrid thrusters is the remarkable complexity and difficulty associated with achieving successful and consistent thruster operation. Kline, et al. in U.S. Pat. No. 6,125,763 disclose an invention that utilizes the majority of advances in the state-of-the-art, e.g. a membrane for the purpose of insulating the solid propellant charge until such time as it is needed to ignite, a valve to control combustion chamber pressure, a liquid propellant feed system to throttle thrust, etc. Again, such a system, although providing all of the needed functionality for a thruster requires a very complicated thrusting system.

Accordingly, although state-of-the-art thrusters capable of throttling thrust, including multiple start/stop/restart cycles exist, each system suffers significant drawbacks, and, as such, a need exists for a simple, inexpensive, reliable thruster design capable of throttling thrust, including multiple start/stop/restart cycles.

SUMMARY OF INVENTION

This invention is directed to solid propellant thrusters capable of throttling thrust, including multiple start/stop/restart cycles.

In one embodiment the invention is directed to a device to initiate thrust production by application of electrical power to a solid propellant.

In an alternative embodiment of the invention thrust production is sustained by application of electrical power to a solid propellant.

In another alternative embodiment of the invention the magnitude of thrust production is controlled by controlling the magnitude of electric power applied to a solid propellant.

In yet another alternative embodiment of the invention the magnitude of thrust production is controlled by controlling the magnitude of electric power applied to a solid propellant.

In still another alternative embodiment of the invention extinguishment of solid propellant combustion is enabled by removal of the applied electrical power.

In still yet another alternative embodiment of the invention the device is capable of multiple start/stop/restart cycles.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

The present invention is directed to a solid propellant thruster capable of controlled thrust and multiple start/stop/restart cycles.

Figure 1A:
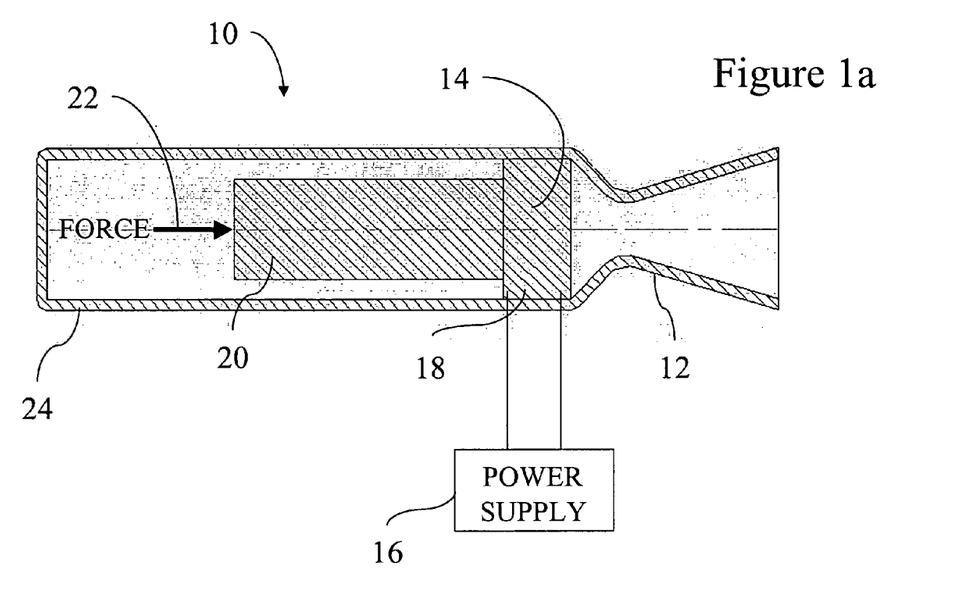
FIGS. 1a, 1b, and 1c schematically show the general component arrangement of the nozzle, combustion region, electric circuit, and propellant feed of an exemplary embodiment of the invention.

Although many suitable configurations of the current invention are possible, common to all embodiments of thrusters of the invention, as shown in FIG. 1a, are an electrical power source, an electrical power control circuit, a nozzle, a motor casing, a combustion zone, and a means of maintaining electrical contact between the electrodes and propellant. Also common to all embodiments of the thruster is the use of a class of solid propellants whose combustion mechanism depends on electric power such that application of electric power above some critical value results in propellant ignition with subsequent sustained combustion and such that application of electric power below some critical value results in a cessation of combustion.

Accordingly, the current invention is directed broadly to a thruster wherein the application of electric power may be used to ignite a propellant, maintenance of electric power is used to sustain the propellant combustion, variation of the magnitude of electric power may be used to alter the magnitude of thrust production, and removal of electric power may be used to extinguish the propellant burning.

Generally, a propellant comprises several components: (1) a fuel, i.e., the component which actually burns, such as, hydrogen, diesel fuel, and kerosene; (2) an oxidizer, i.e., the component which reacts with the fuel oxidatively, such as oxygen, ammonium nitrate (fertilizer), hydroxyl ammonium nitrate, nitrogen tetroxide, and hydrazine; and (3) a binder, i.e., the component which provides mechanical integrity to the fuel and oxidizer mix, such as polymers and sawdust.

For example, a pure fuel/oxidizer mix burned in many rocket engines, such as the space shuttle main engines, is liquid hydrogen mixed with liquid oxygen (LOX). An example of a fuel that is easier to handle is kerosene, which is also mixed with LOX and burned in rocket engines. Hypergolic liquids are those that spontaneously exothermically react upon contact with each other. In contrast, solid propellants typically sit stably with the fuel in contact with the oxidizer until they are heated sufficiently to melt and then the fuel and oxidizer mix as a liquid and burn.

Examples of fuel/oxidizer/binder mixes include: nitroglycerine, which is a large molecule that has an oxidizer half and a fuel half and decomposes explosively; and dynamite, which incorporates a sawdust binder to stabilize the nitroglycerine.

Although explosives such as dynamite are closely related to propellants, there are significant differences. Explosives have energy stored in highly strained bonds (such as, TNT for example) and typically have oxidizer and fuel parts contained within the same molecule, and generally require some kind of stimulus to ignite. In contrast, propellants typically have separate fuel and oxidizer components (though it is quite common to supplement the oxygen balance by utilizing fuels containing oxygen atoms) and a stimulus is required to initiate the exothermic reaction of the fuel and oxidizer. Accordingly, for propellants the energy release is not just provided in the release of strained bonds, but rather in the thermodynamics and energetics of the reaction.

The thrusters described in the present invention are directed to electrically controllable rocket motors based on a class of controllable propellants called electrically controlled extinguishable solid propellants (ECESPs). One exemplary material is disclosed in a patent entitled: "Solid Solution Vehicle Airbag Clean Gas Generator Propellant", U.S. Pat. No. 5,847,315, issued on Dec. 8, 1998, to Arthur Katzakian, Jr., et al.; a U.S. patent application entitled: "Electrically Controlled Propellant Composition and Method", application Ser. No. 10/136,786, filed Oct. 30, 2002 to Arthur Katzakian, Jr., et al.; and a U.S. provisional patent application entitled: "Electrically Controlled Solid Propellant", registration No. 39,209, filed Apr. 24, 2002 to Arthur Katzakian, Jr., et al., the disclosure of which is incorporated herein by reference.

Accordingly, broadly speaking, the current invention requires a propellant, which is stable until the application of a potential difference (voltage) occurs.

Figure 1B:
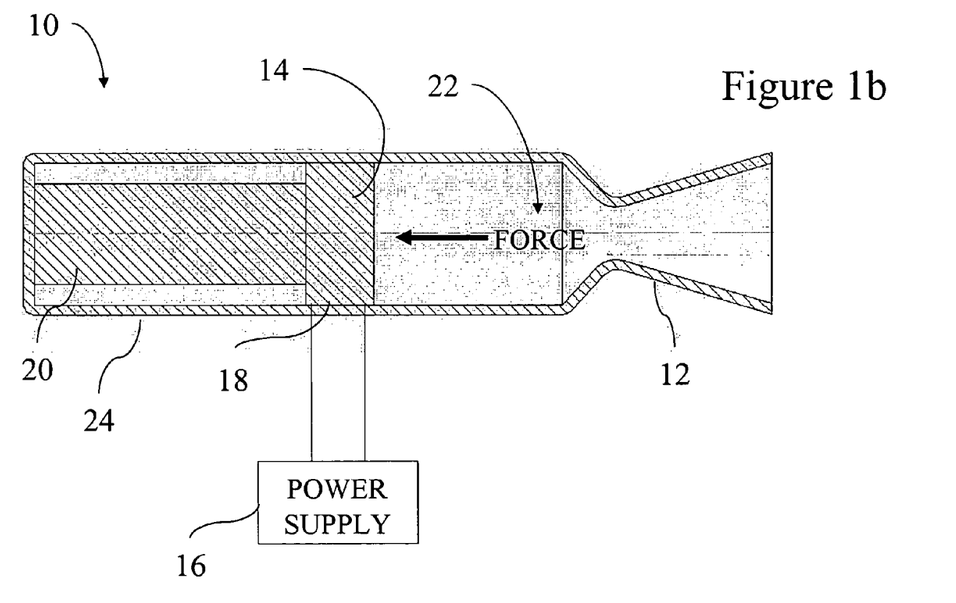
Figure 1C:
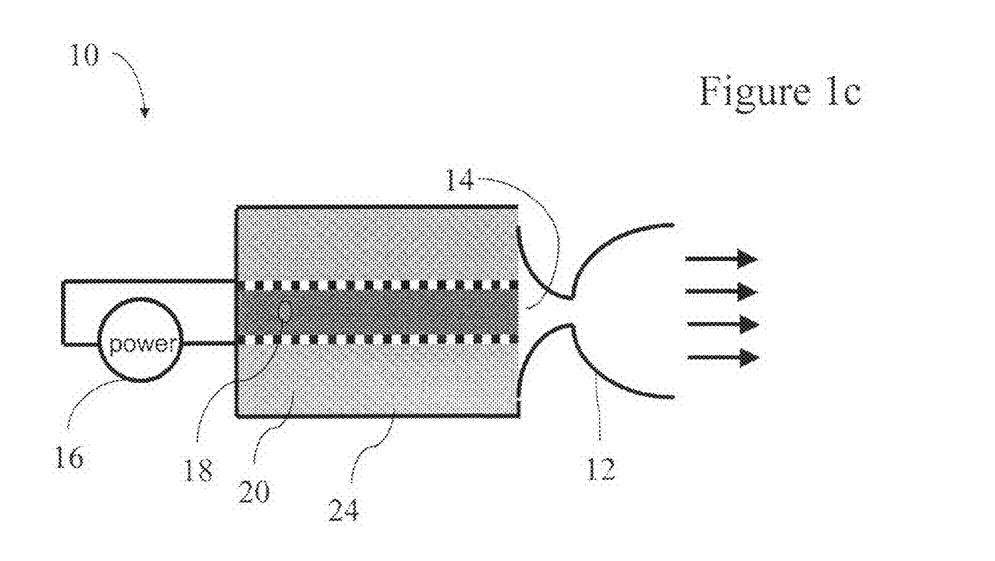
Figure 2A:
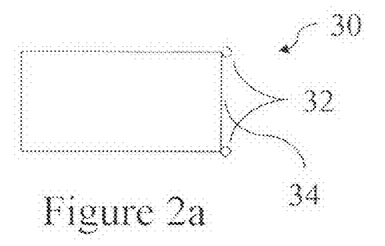
FIGS. 2a to 2e schematically show an exemplary embodiment incorporating a POSTS configuration.
Figure 2B:
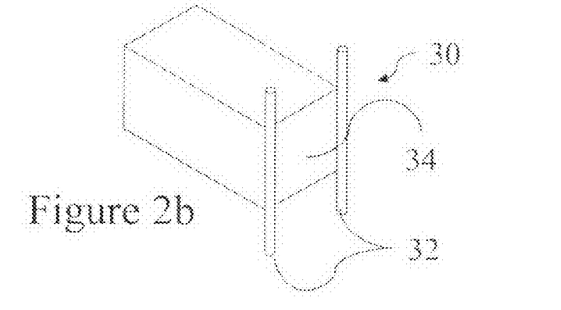
Figure 2C:
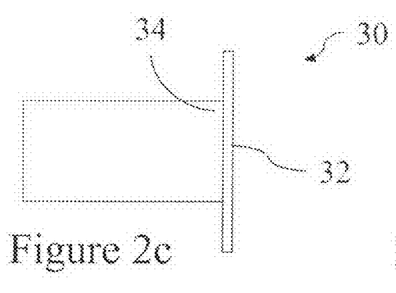
Figure 2D:
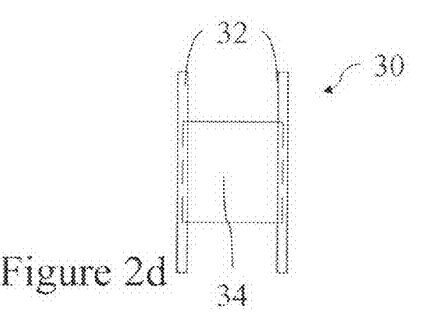
Figure 2E:
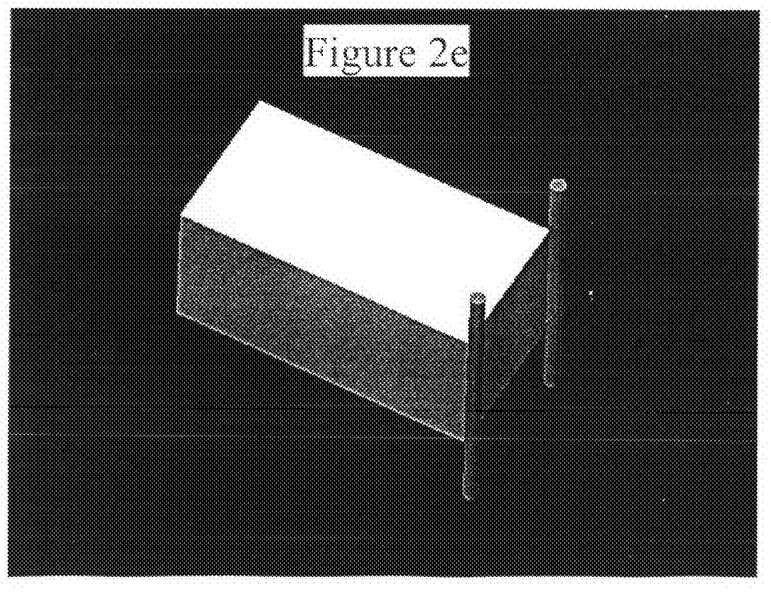
Figure 3A:
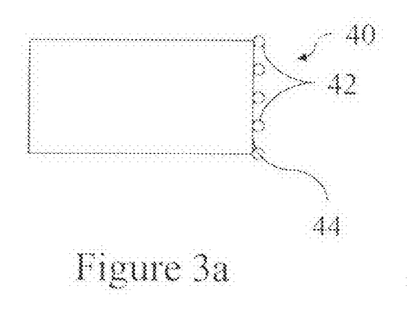
FIGS. 3a to 3e schematically show an exemplary embodiment incorporating a FENCE configuration.
Figure 3B:
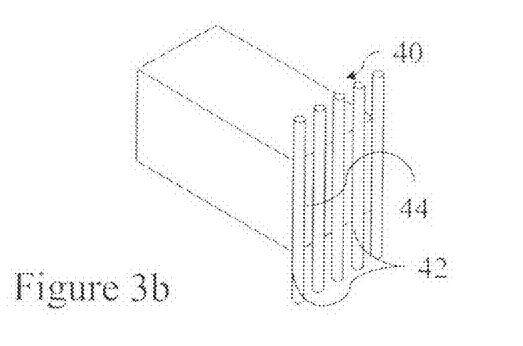
Figure 3C:
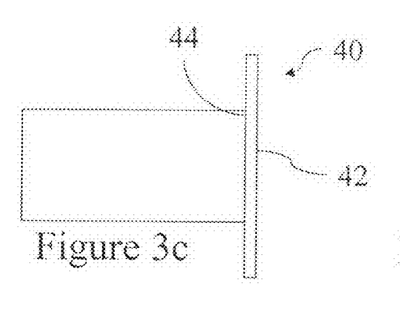
Figure 3D:
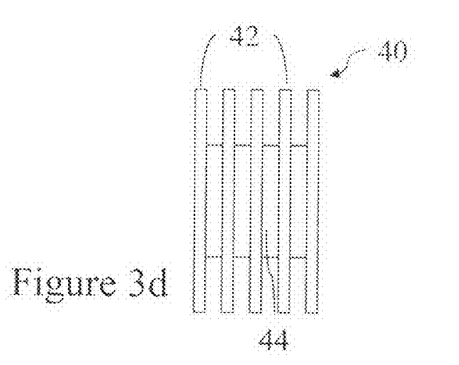
Figure 3E:
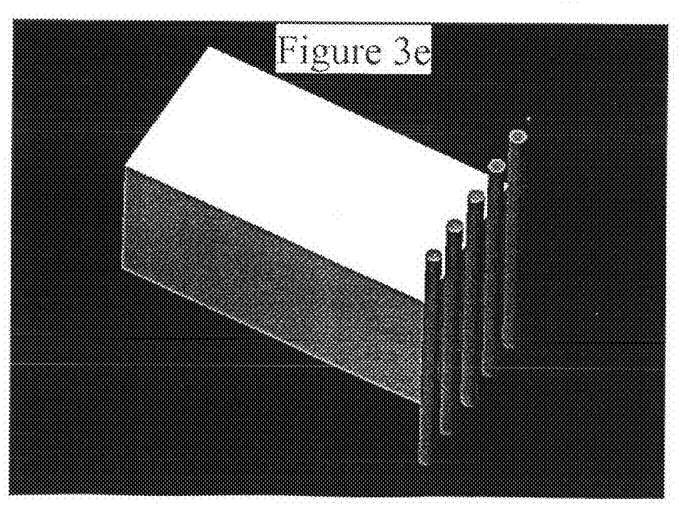
Figure 4A:
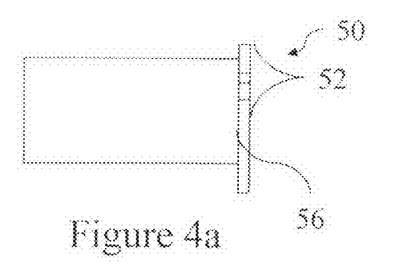
FIGS. 4a to 4e schematically show an exemplary embodiment incorporating a RAKE configuration.
Figure 4B:
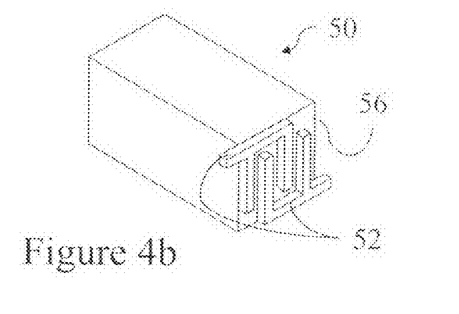
Figure 4C:
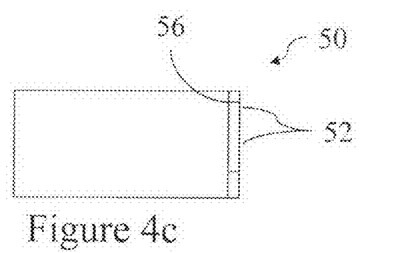
Figure 4D:
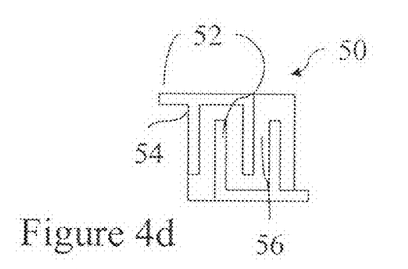
Figure 4E:
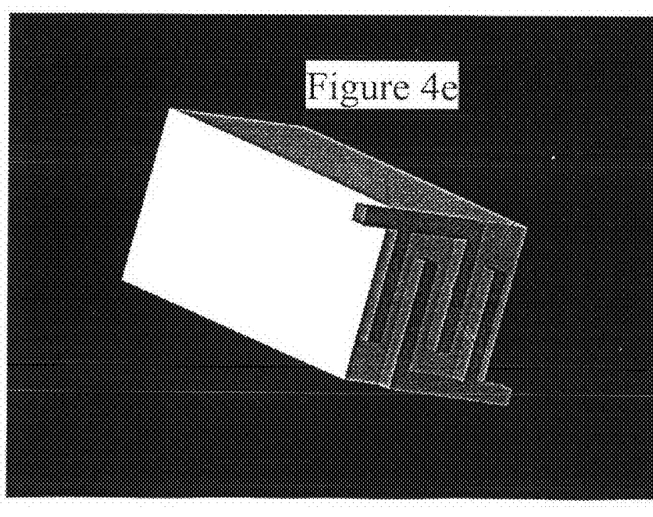
Figure 5A:
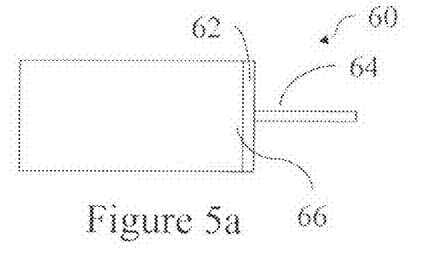
FIGS. 5a to 5e schematically show an exemplary embodiment incorporating a RING configuration.
Figure 5B:
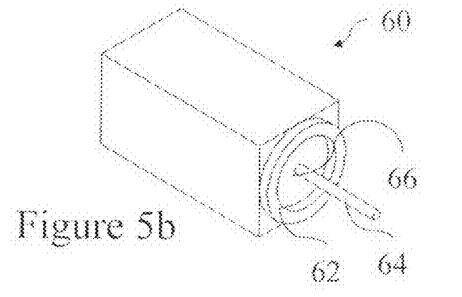
Figure 5C:
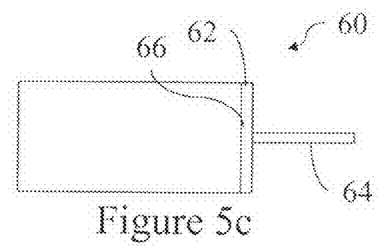
Figure 5D:
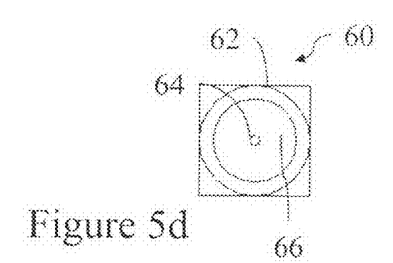
Figure 5E:
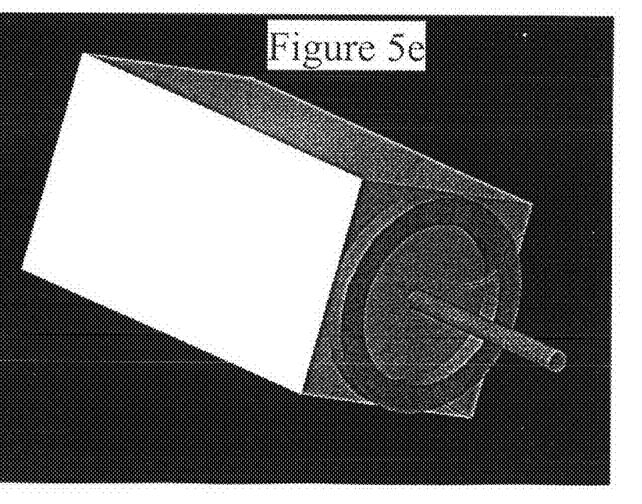
Figure 6A:
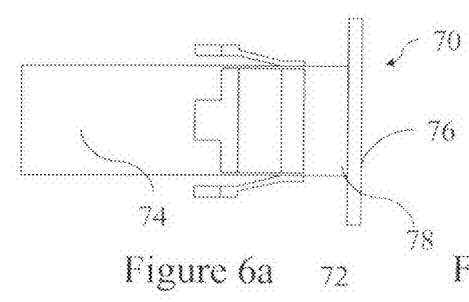
FIGS. 6a to 6e schematically show an exemplary embodiment incorporating a COLLAR configuration.
Figure 6B:
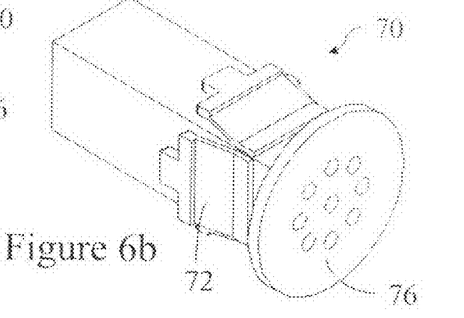
Figure 6C:
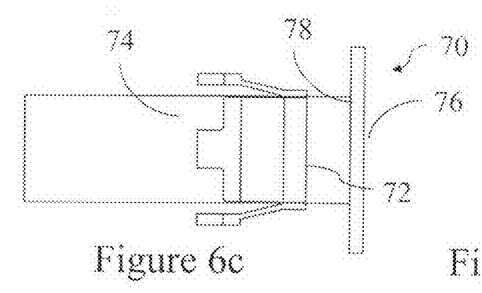
Figure 6D:
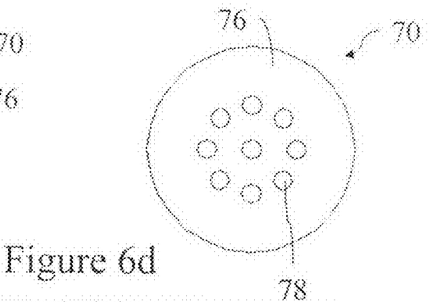
Figure 6E:
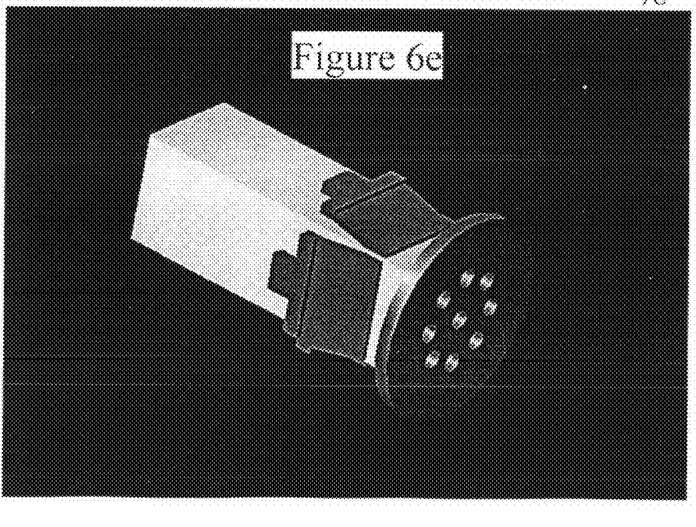
Figure 7A:
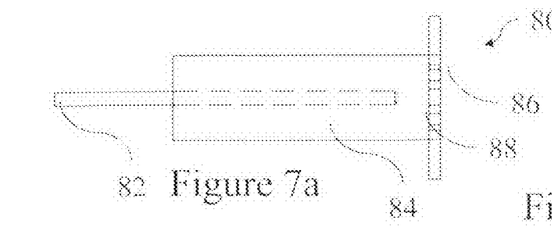
FIGS. 7a to 7e schematically show an exemplary embodiment incorporating a ROD configuration.
Figure 7B:
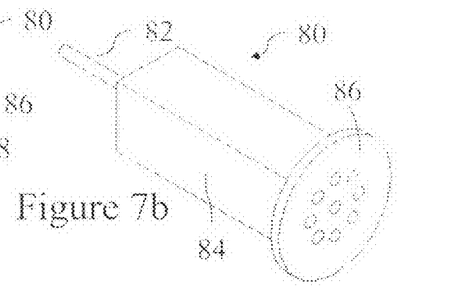
Figures 7C, 7D:
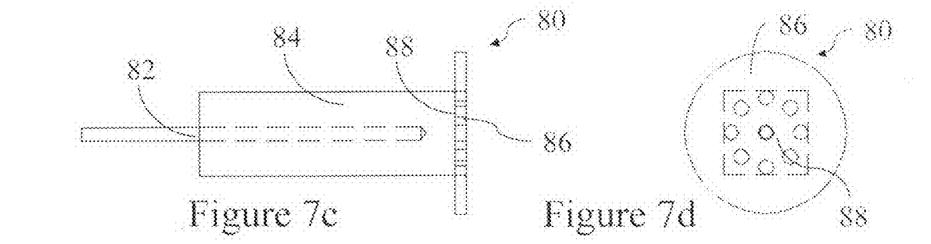
Figure 7E:
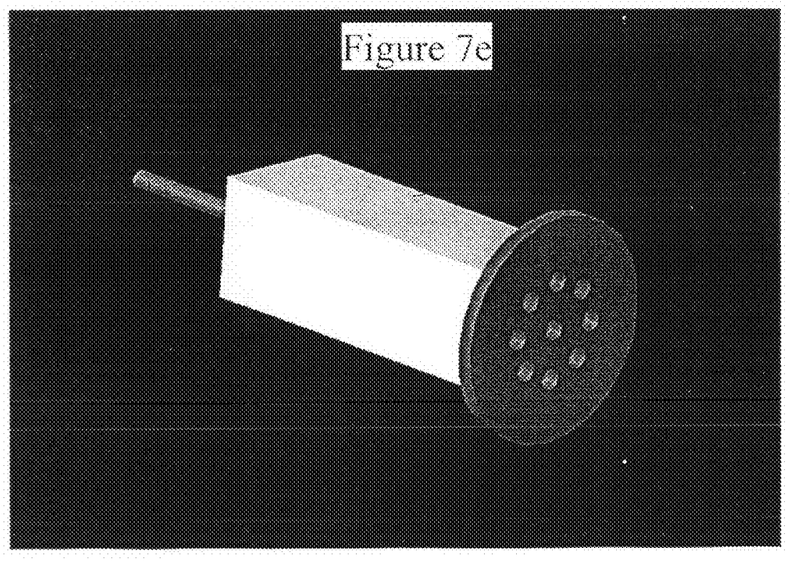
Figures 8A, 8B:
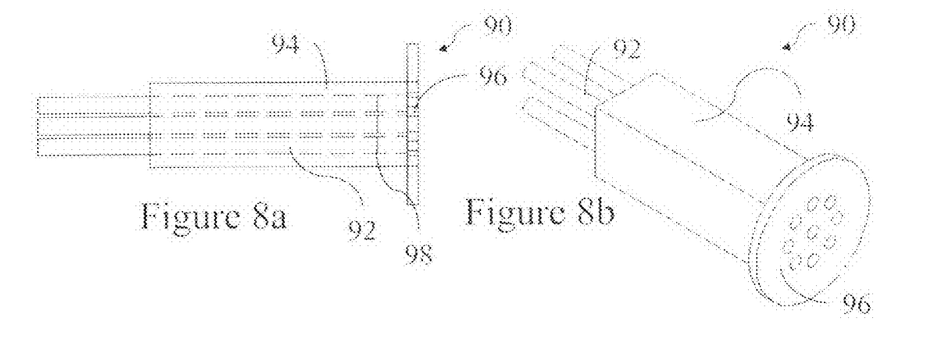
FIGS. 8a to 8e schematically show an exemplary embodiment incorporating a RODS configuration.
Figures 8C, 8D:
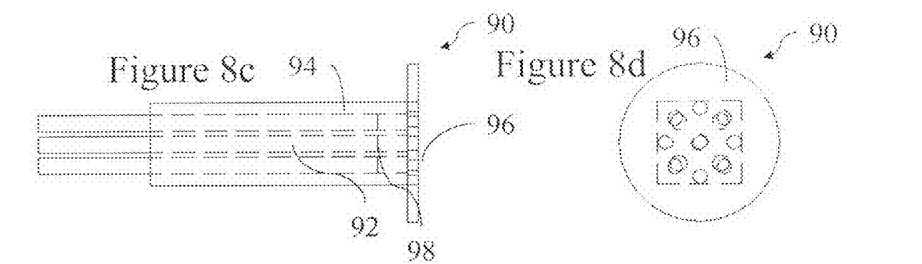
Figure 8E:
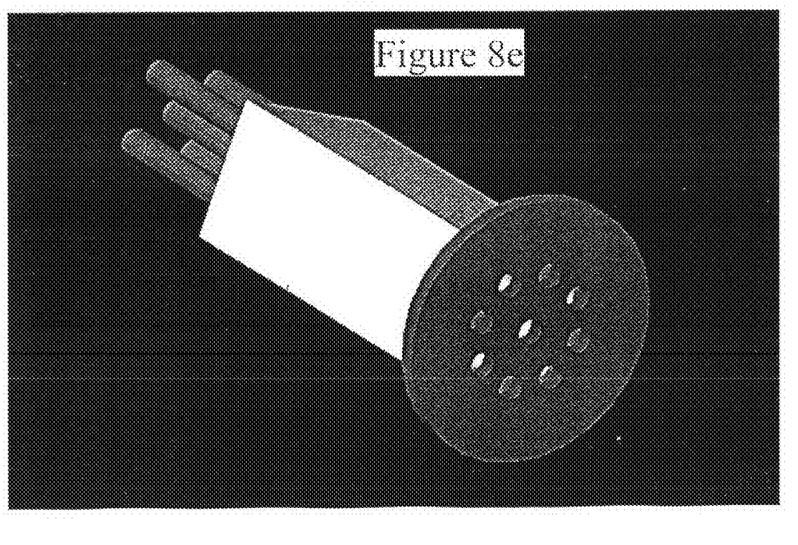
Figure 9A:
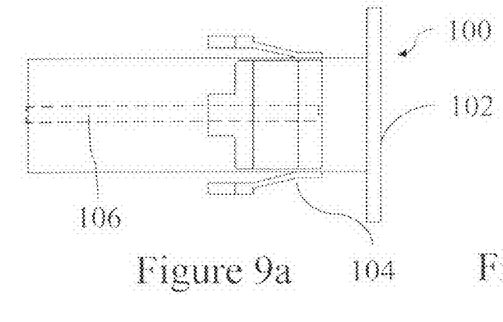
FIGS. 9a to 9e schematically show an exemplary embodiment incorporating a COMBO configuration.
Figure 9B:
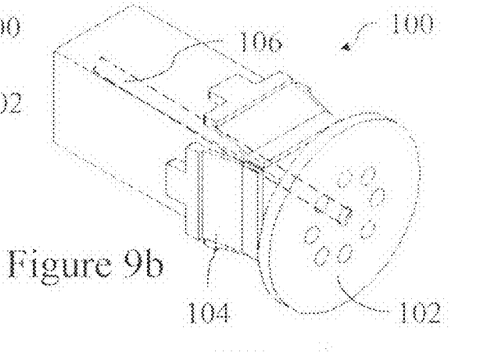
Figure 9C:
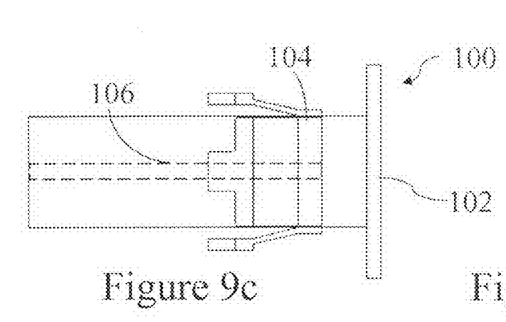
Figure 9D:
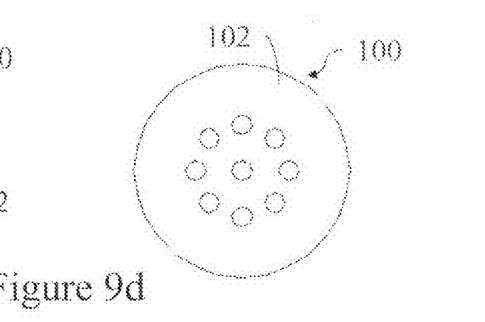
Figure 9E:
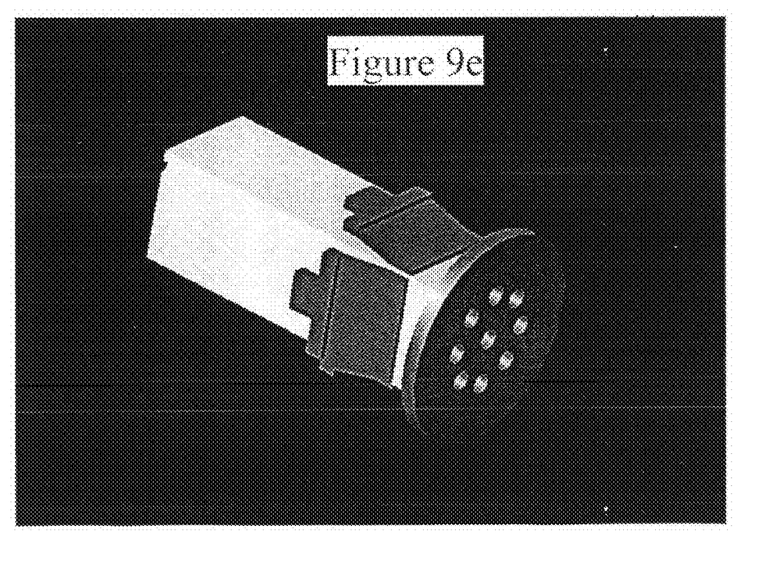
Figures 10A, 10B:
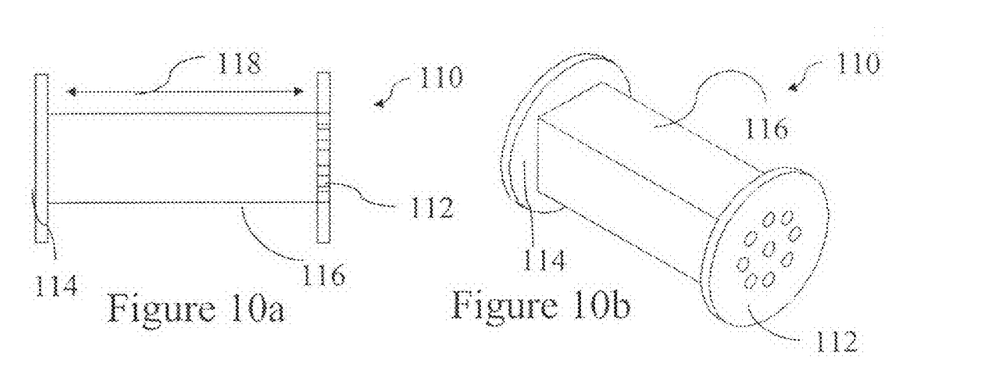
FIGS. 10a to 10e schematically show an exemplary embodiment incorporating a SANDWICH configuration.
Figure 10C:
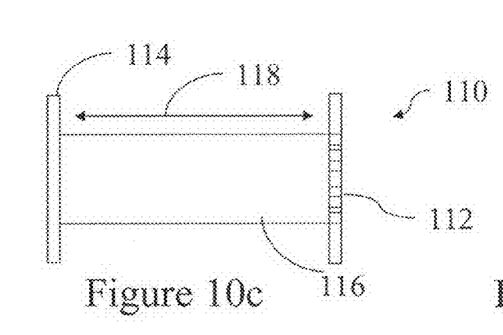
Figure 10D:
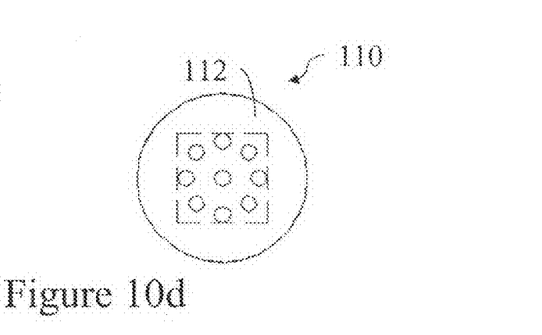
Figure 10E:
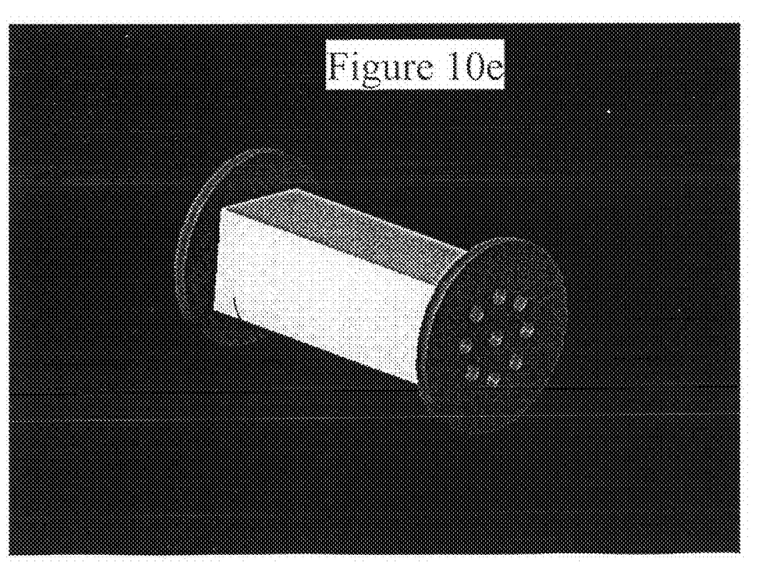
Figures 11A, 11B:
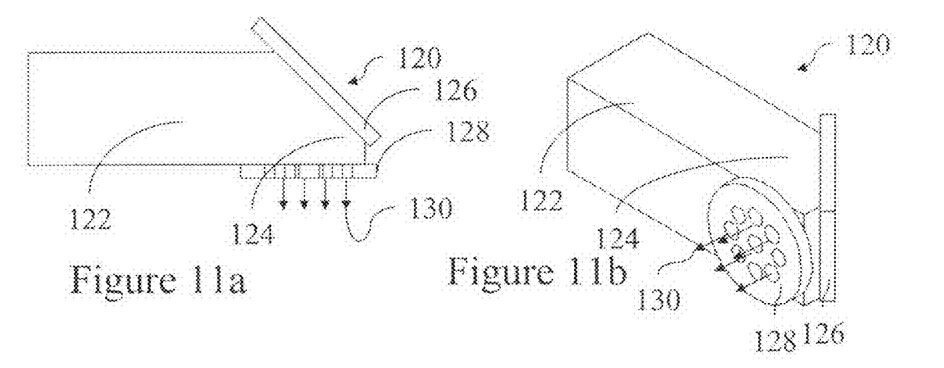
FIGS. 11a to 11e schematically show an exemplary embodiment incorporating a SIDE FED configuration.
Figure 11C:
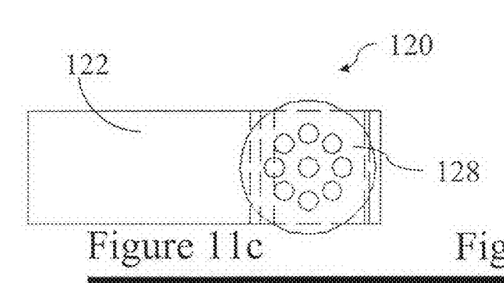
Figure 11D:
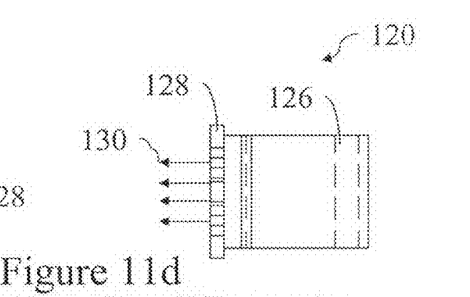
Figure 11E:
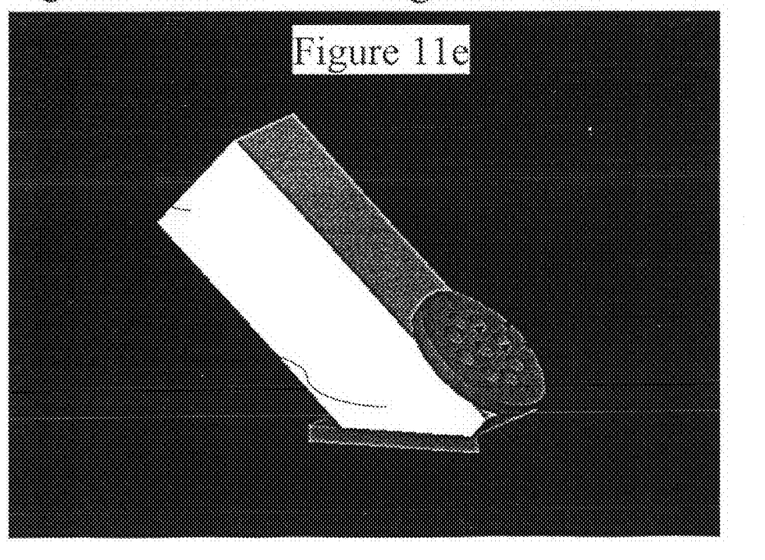

FIG. 1 schematically shows the general component arrangement of a thruster 10, including the nozzle 12, combustion region 14, and electric circuit 16 according to one embodiment of the current invention. Three general variations in the means of maintaining electrical contact between the propellant 20 and the electrodes 18 are shown in FIGS. 1a, b, and c, in which the applied force 22 acts on either the propellant or the electrode assembly. For example, FIGS. 1a and b show end burning configurations, while FIG. 1c shows a core burning configuration. Although the preferred embodiments are shown with propellant grains 22 and motor casings 24 of either circular or square shaped cross-sections, it should be understood that the current invention is not limited to only these shapes.

Although the performance thrusters of the invention are sensitive to the propellant formulation, as discussed above, performance is also dependent on a number of design parameters. For example, the choice of electrode materials, electrode spacing, the type of electric power, the geometric arrangement of the electrodes, the means of maintaining electrical contact between the electrodes, and the propellant grain all may influence the thruster motor function.

First, judicious choice of the electrode material is critical for all motor embodiments and suitable candidate materials must be electrically conductive (e.g., metallic elements, metal alloys, carbon, conductive ceramics, etc.). The electrodes may, or may not, be required to maintain mechanical integrity during combustion phases for a particular embodiment. Candidate materials may enhance motor performance by catalytic action (such as, for example, aluminum or copper). Some embodiments may capitalize upon the electrolytic nature of the combustion mechanism to determine the location of the combustion zone (e.g., the polarity of direct current and electrode material choice).

Electrode spacing in the motor embodiments also influences the electrical efficiency of motor operation and plays a role in motor optimization. A number of parametric motor embodiment options exist including core burning and end burning designs: Two categories of thruster embodiments, hereby defined as facial-extent electrode configurations and axial-extent electrode configurations, are presented in FIGS. 2 to 11 to exemplify some possible embodiments of the current invention.

Facial-Extent Electrode Configuration

Facial-extent electrode thrusters are characterized by electrode placement on the end face of the propellant, such that combustion occurs exclusively at the end face of the propellant. In these configurations, the electrode separation is of a fixed distance, as determined to provide optimal efficiency of motor operation. Also common to facial-extent electrode thrusters is the requirement for a means of maintaining the electrical contact between the propellant and the electrodes throughout all phases of motor operation.

Two possible embodiments of such means are shown in FIGS. 1a and b. In the embodiment shown in FIG. 1a, the electrodes 18 are rigidly fixed relative to the motor casing 24 and a force 22 is applied to the propellant 20 such that electrical contact is maintained between the propellant and the electrodes throughout all phases of motor operation. In the embodiment shown in FIG. 1b, the propellant 20 is rigidly fixed relative to the motor casing 24 and a force 22 is applied to the electrode assembly 18 such that electrical contact is maintained between the propellant and the electrodes throughout all phases of motor operation. The balance between the applied force and the mechanical integrity of the propellant grain is particularly important for facial-extent electrode thrusters. The tendency in these systems is for propellant extrusion to occur through the electrode assembly if the mechanical integrity of the propellant grain is not sufficiently strong to balance, during the combustion phase, the applied force that maintains the electrical contact between the propellant and the electrodes. Also important, but to a less restrictive degree is the form of applied electrical power and the choice of electrode materials. Alternating current, direct current, and capacitive discharges are examples of viable forms of electrical power for facial-extent electrode thrusters. A few representative embodiments of various thruster designs are shown in FIGS. 2 to 5, below.

One embodiment of a facial-extent electrode thruster is called the POSTS design. FIGS. 2a to 2e schematically show the preferred embodiment of the POSTS configuration thruster 30. This design is characterized by a pair of electrodes 32 having a fixed distance separation positioned on opposite sides of the propellant surface 34 at which combustion occurs. This design may utilize, but is not limited to, a pair of cylindrically symmetric rod electrodes mounted parallel to each other a fixed distance apart and also mounted parallel to the propellant combustion surface. Alternate embodiments may utilize complex shapes for the electrodes, such as, for example, flat or curved plates, etc.

Another embodiment of a facial-extent electrode thruster is called the FENCE design. FIGS. 3a to 3e schematically show the preferred embodiment of the FENCE configuration thruster 40. The FENCE design is an extension of the POSTS design, in that a plurality of electrodes 42 are used. However, the FENCE design is characterized by multiple electrodes 42 arranged with a fixed distance separation, but not necessarily evenly distributed across the propellant surface 44 at which combustion occurs. The FENCE design electrodes may have electrical power applied such that the polarity of adjacent leads alternates, between positive and negative polarity in the case of a DC or a Capacitor Discharge power source, or between hot and neutral in the case of an AC power source. The complex electrode shapes discussed in the POSTS configuration are also applicable to the FENCE configuration.

Still another embodiment of a facial-extent electrode thruster is called the RAKE design. The RAKE design is an extension of the POSTS design. The RAKE design is characterized by electrodes of complex curve shape, which are not necessarily confined to one plane. Another embodiment of the RAKE design would incorporate a plurality of electrodes having a complex curve shape. FIGS. 4a to 4e schematically show a preferred embodiment of the RAKE design thruster 50 incorporating a pair of complex electrodes 52 having shapes including 90 degree angles 54 aligned across the combustion face 56 of the propellant. It should be understood that although the electrodes 52 of the embodiment shown contain 90 degree angles 54 it should be understood that the embodiment shown is merely exemplary and no restriction to such orthogonality is intended, nor is there a restriction that the electrodes be linear, and suitable complex shape disposed across the face of the propellant, including compound curves, may be utilized in the current embodiment.

Yet another embodiment of a facial-extent electrode thruster is called the RING design. The RING design thruster 60 is characterized by concentric electrodes. This design is not limited to cylindrical symmetry, though the preferred embodiment shown in FIGS. 5a to 5e include a central rod 62 serving as one electrode having a ring 64 about the rod serving as the other electrode. As in all embodiments of the invention, the electrodes are maintained in electrical contact with the propellant surface 66 at which combustion occurs.

Axial-Extent Electrode Configuration

Axial-extent electrode thrusters are characterized by electrode spacing that is extended along the principle axis of symmetry. In these configurations, the electrode material, the magnitude of the electrode area in contact with the propellant, and the polarity of electric power dictate the location of propellant combustion, although these thrusters are typically designed to ensure that thrust occurs at the end face of the propellant. Though material selection influences the combustion process for both categories of thrusters, it is particularly critical to the operation of an axial-extent electrode thruster because material selection, concomitant with electrical polarity, defines the location of combustion.

In such thruster designs, electric power and electrode polarity significantly influence the combustion process. For example, in embodiments in which an alternating current electric power source is utilized, the electrode material is the dominant factor in determining combustion location. For example, when one electrode material is copper and the other electrode material is aluminum, combustion will preferentially occur at the copper electrode. This phenomena is relevant to both motor configurations, but is critical in defining the combustion zone for axial-extent electrode thrusters.

In contrast, in embodiments in which a direct current electric power source is utilized, the electrode material is no longer necessarily the dominant factor in determining combustion location. In such a direct current embodiment, the combination of electrode material and polarity must be considered carefully, as in some configurations combustion may occur vigorously, while in others combustion may actually be hindered. For example, all axial-extent electrode thrusters include one electrode designated the SHOWERHEAD and have variations in the expression and number of the other electrodes. In such embodiments the SHOWERHEAD electrode may comprise a plate with any number of holes therethrough, may be shaped like a ring or concentric rings, or the may consist of rods or other complex shapes. In most motor embodiments combustion occurs at the SHOWERHEAD electrode. Several exemplary embodiments of axial-extent electrode thrusters are provided having a SHOWERHEAD electrode in the form of a plate with holes.

One embodiment of an axial-extent electrode thruster is called the COLLAR design. The preferred embodiment of the COLLAR design thruster 70 is shown in FIGS. 6a to 6e. The COLLAR design is characterized by a set of electrodes 72 positioned about the outside circumference of the propellant 74, a fixed distance from the SHOWERHEAD electrode 76, which is positioned at the combustion surface 78 of the propellant.

Another embodiment of an axial-extent electrode thruster is called the ROD design. The preferred embodiment of the ROD design thruster 80 is shown in FIGS. 7a to 7e. The ROD design is characterized by a single rod electrode 82, set coaxial with the propellant grain 84, terminating a fixed distance from the SHOWERHEAD electrode 86, such that the propellant 84 is surrounding the central rod 82. The propellant continues combustion at the SHOWERHEAD end 88, with the central rod remaining fixed relative to the casing. As the propellant is consumed, the remaining propellant 84 slides along the central rod 82 toward the SHOWERHEAD electrode 86.

Still another embodiment of an axial-extent electrode thruster is called the RODS design. The RODS design thruster 90 is characterized by a plurality of rod electrodes 92 within the propellant grain 94, terminating a fixed distance from the SHOWERHEAD electrode 96. Although the preferred embodiment of the RODS design thruster 90 is shown in FIGS. 8a to 8e with uniform distance between the rod electrode ends 98 and the SHOWERHEAD electrode 96, rods of varying lengths may also be used.

Yet another embodiment of an axial-extent electrode thruster is called the COMBO design. The preferred embodiment of the COMBO design thruster 100 is shown in FIGS. 9a to 9e. The COMBO design is characterized by the incorporation of features from both the ROD (or RODS) design and the COLLAR design. In the COMBO embodiment, for example, the SHOWERHEAD electrode 102 is a fixed distance from an external COLLAR electrode 104 and an internal ROD or RODS electrode 106.

Still yet another embodiment of an axial-extent electrode thruster is called the SANDWICH design. The preferred embodiment of the SANDWICH design thruster 110 is shown in FIGS. 10a to 10e. The SANDWICH design is characterized by a pair of electrodes 112 and 114 of variable distance, separated by the length of the propellant 116. The electrode spacing 118 is such that as propellant is combusted, the spacing decreases, continually maintaining the electrical contact between the propellant and the electrodes.

Finally, another embodiment of an axial-extent electrode thruster is called the SIDE FED design. The SIDE Fed design 120 is characterized by an electrode arrangement such that propellant 122 is introduced into the electrode region 124 between a first electrode 126 and the SHOWERHEAD electrode 128 in non-parallel fashion relative to the thrust vector 130. Although the preferred embodiment of the SIDE FED design thruster 120 is shown in FIGS. 11a to 11e with a perpendicular feed motion of the propellant, this design is not limited to the angle shown.

Although certain exemplary thruster designs are described in the exemplary thruster embodiments described above, it should be understood that any thruster design suitable for ensuring electrical contact between the propellant combustion face and the electrode or electrodes may be utilized in the current invention.

A disclosure of methods of controlling the electrically controlled propellant motors according to this invention is described in the concurrently filed application entitled "Methods Of Controlling Solid Propellant Ignition, Combustion, And Extinguishment", U.S. Provisional App. No. 60/349,074, filed Jan. 16, 2002, the disclosure of which is incorporated herein by reference.

The preceding description has been presented with reference to presently preferred embodiments of the invention.

Workers skilled in the art and technology to which this invention pertains will appreciate that alterations and changes in the described structure may be practiced without meaningfully departing from the principal, spirit and scope of this invention.

Accordingly, the foregoing description should not be read as pertaining only to the precise structures described and illustrated in the accompanying drawings, but rather should be read consistent with and as support to the following claims which are to have their fullest and fair scope.

What is claimed is:

1. A solid propellant thruster comprising:
a thruster body containing a solid propellant;
a source of electrical power in electrical communication with said solid propellant; and
wherein the propellant ignites to produce a thrust only with the application of electrical power to the solid propellant from the source.

2. The solid propellant thruster as described in claim 1, wherein the magnitude of the thrust is dependent on the magnitude of the electrical power applied to the solid propellant.

3. The solid propellant thruster as described in claim 1, wherein the thrust is maintained only with the continued application of the electrical power to the solid propellant.

4. The solid propellant thruster as described in claim 1, wherein the solid propellant thruster is capable of a plurality of start/stop/restart cycles.

5. The solid propellant thruster as described in claim 1, wherein the solid propellant is a solid solution propellant.

6. The solid propellant thruster as described in claim 1, wherein the thruster body further comprises at least one electrode to provide electrical communication from the source to the solid propellant.

7. The solid propellant thruster as described in claim 6, wherein the thruster body further comprises a feeder mechanism to ensure continuous contact between the electrode and the solid propellant.

8. The solid propellant thruster as described in claim 7, wherein the solid propellant is moveable relative to the electrode, which is fixed and the feeder mechanism is a resilient member in contact with the solid propellant such that the solid propellant is maintained in continuous electrical communication with the electrode.

9. The solid propellant thruster as described in claim 7, wherein the electrode is moveable relative to the solid propellant, which is fixed and the feeder mechanism is a resilient member in contact with the electrode such that the electrode is maintained in continuous electrical communication with the solid propellant.

10. The solid propellant thruster as described in claim 6, wherein the electrode is made of a material selected from the group consisting of: metals, metal alloys, carbon, and conductive ceramics.

11. The solid propellant thruster as described in claim 6, wherein the electrode is made of one of either aluminum or copper.

12. The solid propellant thruster as described in claim 6, wherein the solid propellant has a body defining an axis disposed between an end face and a combustion face, and wherein the combustion face is aligned parallel to the thrust.

13. The solid propellant thruster as described in claim 12, wherein the body of the solid propellant has either a square or circular cross-section.

14. The solid propellant thruster as described in claim 12, wherein the at least one electrode is positioned a fixed distance away from the solid propellant.

15. The solid propellant thruster as described in claim 12, wherein the thruster comprises at least two electrodes positioned orthogonal to the solid propellant at a fixed distance on opposite sides of the combustion face of the solid propellant.

16. The solid propellant thruster as described in claim 12, wherein the thruster comprises a parallel row of a plurality of electrodes positioned orthogonal to the solid propellant arranged at fixed distances across the combustion face of the solid propellant.

17. The solid propellant thruster as described in claim 12, wherein the thruster comprises at least two electrodes disposed on the combustion face of the solid propellant.

18. The solid propellant thruster as described in claim 17, wherein the at least two electrodes are cylindrical.

19. The solid propellant thruster as described in claim 17, wherein the at least two electrodes comprise interlocking bars containing at least one right angle.

20. The solid propellant thruster as described in claim 12, wherein the thruster comprises at least two coaxial cylindrical electrodes arranged on the combustion face of the solid propellant.

21. The solid propellant thruster as described in claim 12, wherein the thruster comprises at least two electrodes, where a first electrode is disposed at the combustion face and where at least one second electrode is disposed along the body of the solid propellant.

22. The solid propellant thruster as described in claim 21, wherein the first electrode comprises a cylinder having at least one passage therethrough along the axis of said cylinder, and wherein at least two second electrodes are disposed along at least two outer surfaces of the body of the solid propellant a fixed distance from said first electrode.

23. The solid propellant thruster as described in claim 21, wherein the thruster further comprises a third cylindrical electrode disposed within the body parallel to the axis of the solid propellant.

24. The solid propellant thruster as described in claim 12, wherein the thruster comprises at least two electrodes, where a first electrode is disposed at the combustion face and where at least one second cylindrical electrode is disposed within the body of the solid propellant along the axis of said solid propellant.

25. The solid propellant thruster as described in claim 24, wherein the thruster comprises at least two second cylindrical electrodes.

26. The solid propellant thruster as described in claim 12, wherein the thruster comprises at least one cylindrical electrode having at least one passage therethrough disposed on the end face of the solid propellant and at least one cylindrical electrode having at least one passage therethrough disposed on the combustion face of the solid propellant.

27. The solid propellant thruster as described in claim 12, comprising at least first and second electrodes arranged such that the solid propellant is introduced into an electrode region between the first electrode and the second electrode in a non-parallel fashion relative to the thrust.

28. The solid propellant thruster as described in claim 12, wherein the solid propellant is ignited at the end face.

29. The solid propellant thruster as described in claim 12, wherein the solid propellant is ignited within the body of the solid propellant.

30. The solid propellant thruster as described in claim 1, wherein the electrical power is selected from the group consisting of alternating current, direct current, and capacitive discharge.

* * * * *